C. Manning,
Making Staves.

No. 29. Reissued Dec. 28, 1840.

A.M. PHOTO-LITHO. CO. N.Y. (OSBORNE'S PROCESS)

UNITED STATES PATENT OFFICE.

CEPHAS MANNING, OF ACTON, MASSACHUSETTS.

IMPROVEMENT IN MACHINES FOR CUTTING STAVES, &c.

Specification forming part of Letters Patent No. 1,787, dated September 14, 1840; Reissue No. 29, dated December 28, 1840.

*To all whom it may concern:*

Be it known that I, CEPHAS MANNING, of Acton, in the county of Middlesex and State of Massachusetts, have invented new and useful Improvements in Machinery for Cutting Staves, or such other articles as may be successfully formed by said machinery.

The said improvements, the principles thereof, and manner in which I have contemplated the application of the same, by which they may be distinguished from other inventions of a similar nature, together with such parts or combinations I claim to be my invention and consider original and new, I have herein set forth and described.

The said description, taken in connection with the accompanying drawings herein referred to, forms my specification.

Figure 1:
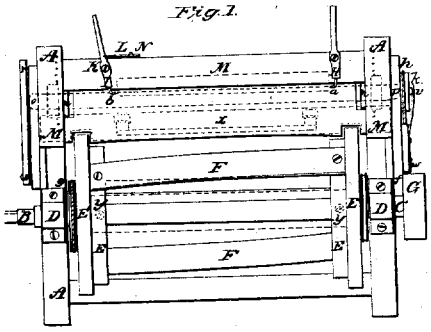
Figure 3:
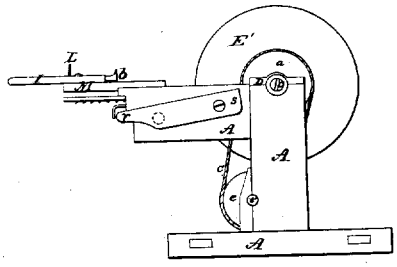
Figure 9:
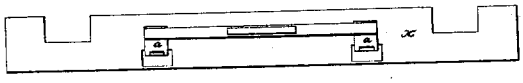
Figure 10:
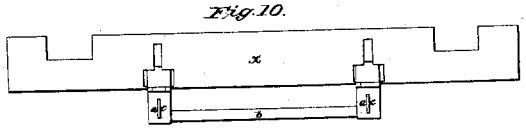
Figure 2:
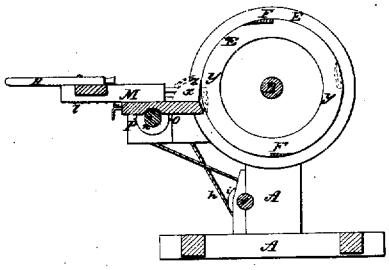
Figure 4:
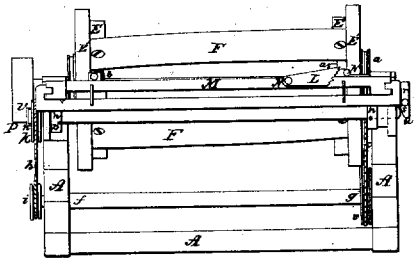

Figure 1 is a top view of my rotary stave-cutter. Fig. 2 is a transverse vertical section of the same. Fig. 3 is an end elevation. Fig. 4 represents a side elevation.

In Fig. 1, A A A is a frame, of wood, iron, or other suitable material, shaped, formed, and constructed in such manner as to support the operative parts thereto attached.

B C, Fig. 1, B, Fig. 2, and C, Fig. 3, is a horizontal shaft which is supported and revolves in beaings or boxes D D, Figs. 1 and 3.

Figure 7:
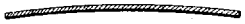
Figure 11:
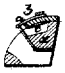
Figure 12:
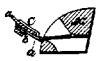
Figure 13:
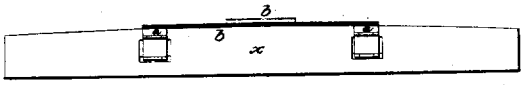

Two heavy circular plates or wheels, E′ E″, Figs. 1, 2, and 3, are placed and affixed on the shaft B C. These plates are suitably formed with a rim, E, on each, to which one end of each of a series of two or more cutting-knives, F F, of proper shape and form, is fastened by bolts having screws and nuts, or in any other suitable or convenient manner. These cutters should be curved longitudinally, as shown in Fig. 7, and transversely, as shown in Fig. 2, in order that the stave separated from the block may have the requisite shape to give to the barrel formed by a certain number of them its proper bilge, or a greater diameter at the center than at the ends, thereby saving the labor of heating and trussing the same. It should be particularly noted that the curve of the back or outside of the knife in a transverse section of the same should be an arc of a circle having its center in the axis of the shaft B C, and that the interior curve of the same should be nearly concentric with it, which peculiar formation of the knife in its transverse section is the only one with which the machine will cut two or more perfectly symmetrical staves from the same block. The knives should be so arranged that the curved shape of their exterior surface transversely shall correspond with and be in the circumference of their circle of revolution, in order that the block may not be pressed away from the cutting machinery by any diagonal or lateral force which might be exerted by the knife if it were not so arranged. If the block is moved while the knife passes through it, it is evident that the opposite faces, or the outside and inside of the stave, cannot be parallel with each other, and that the thickness might be greater on one side than the other.

The useful effect resulting from the peculiar formation of the knives above explained will be more apparent when it is further mentioned that the cutting-edge of a revolving cutter, as it enters and advances in the block of wood, has a tendency to draw it forward, which tendency can only be counteracted by a force acting in a direction from the center of the shaft B C pressing the block backward, which force should be equal to that with which it is drawn forward. This force is obtained by giving the exterior surface of the knife the circular curve above described, for as each point of the said surface progresses in the block it has (until it passes a horizontal line drawn through the center of the circular curve) a tendency to press the block back or outward, and as the force exerted at every point of the surface is the same, it is evident that the outward pressure will equal the inward, and that the block will be kept stationary until the stave is severed. A band from the driving-power, passing over a pulley, G, on the shaft B C, causes the said shaft and cutters to revolve.

The block from which the stave is to be cut is confined between suitable holders or clamps, H I, Fig. 1, as represented in the drawings by dotted lines. One of the holders, H, is stationary, while the other, I, is movable on a pin or center, K. When the block of wood is placed between the holders and driven hard up against the block H, the holder I is turned round on the pin K until its end is brought with sufficient force against the end of the block, which being accomplished, it is secured in this position by the dog L, formed as seen in Figs. 1 and 4. It will be seen that this dog has teeth or notches formed on its end in contiguity with the handle of the holder I, and that the other end of the dog is attached to the moving frame M M by a pin or screw, N, on which it turns freely up or down. Now, when the block of wood is placed between the holders and they are properly pressed against the ends of the same, the dog L will fall in such position that its teeth or notches will rest against the handle of the holder I, and thus confine said holder or cause the same to retain its grasp of the block of wood. The ends *a b* of the holders in contact with the block should be of metal and formed with suitable teeth, as seen in Fig. 4, which, when the holders are pressed against the ends of the block, will enter into the same, and thereby more effectually confine it between the holders and prevent it from slipping or changing its position during the operation of the cutters. The carriage M M is moved forward at regular intervals of time by means of a horizontal shaft, O P. (Represented in dotted lines in Fig. 1, and in Fig. 2 in section at O.) A band, *c*, Fig. 3, passing over a pulley, *d*, on the shaft B C, and a pulley, *e*, on another shaft, *f g*, (seen by dotted lines in Fig. 1 and denoted by *f* in Fig. 2,) gives motion to or revolves the shaft *f g*. From the shaft *f g* motion is communicated to the shaft O P by means of a cross-band, *h*, which passes over a pulley, *i*, on the shaft *f g* and a pulley, *k*, on one end of the shaft O P. Each side of the carriage M has a rack, *l m*, attached underneath the same. (Represented by red dotted lines at *l m* in Fig. 1, and more particularly exhibited at *l m*, Fig. 2.) There are two pinions, *n*, Fig. 2, on the shaft O P, each of which is placed directly under one of the racks *l m*. The number of teeth of these pinions and the spaces between them are regulated according to circumstances. In general I prefer two—viz., *o p*—on opposite sides of the circumference of each pinion, so that each revolution of the pinion will operate on two of the teeth of the rack. Thus it will be seen that when the tooth *o* engages with the teeth of the rack *l m* it pushes the carriage forward a distance equal to the thickness of the stave to be cut from the block. One of the knives then performs its office, and by the time it has passed entirely through the block the opposite tooth, *p*, of the pinion *n* is brought round to engage with the teeth of the rack *l m*, and in its turn operates on the same and moves the carriage M forward a distance equal to the thickness of the staves. So on in succession the carriage M alternately moves forward and stops at regular intervals of time until the block of wood is entirely cut up into staves or the pinions *n* have operated on all the teeth of the racks *l m*.

In order to draw back the carriage M for the purpose of placing another block of wood between the holders, it is only necessary to press downward a lever, *r s*, Figs. 1 and 3, (and seen at *r* in Fig. 4,) and the shaft O P will be moved sidewise in its bearings a sufficient distance to throw the teeth *o p* of the pinions *n* out of gear with the racks *l m*. The inside of the lever *r s*, or that side in contiguity with the frame A, is beveled or chamfered, as shown at *t u*, Fig. 4, against which the end of the shaft O P abuts, so that by pressing down the lever *r s* the beveled or inclined part of the lever *r s* will press or push the shaft O P sidewise in its bearings, thus throwing the teeth of the pinions *n* out of gear with those of the racks *l m*. Then, by placing the hand on the center of the carriage or any other convenient part of the same, it is easily drawn back the required distance. On lifting the lever *r s*, a spring, *v w*, Figs. 1 and 4, acting on the opposite end of the shaft O P, will press the shaft into its original position and engage the teeth of the pinions and rack.

Having thus described my improved machinery for cutting staves, I now proceed to point out such parts thereof I claim to be my invention.

I claim—

1. Curving knives for cutting staves longitudinally, substantially in the manner and for the purposes hereinabove specified.

2. The arrangement of knives attached to the revolving shaft, in combination with the arrangement of machinery for moving forward the carriage in which the block is held as the staves are cut in the manner described, and also in combination with said carriage moved forward at regular intervals of time, as above set forth.

In testimony that the above is a true description of my said invention and improvement, I have hereto set my signature this 27th day of October, 1840.

CEPHAS MANNING.

Witnesses:
R. H. EDDY,
JOHN NOBLE.